United States Patent
Kolev et al.

(10) Patent No.: US 6,259,681 B1
(45) Date of Patent: Jul. 10, 2001

(54) METHOD AND APPARATUS FOR REDUCING THE POWER CONSUMPTION OF A BATTERY OPERATED TRANSCEIVER

(75) Inventors: Iavor Kolev, Tygelsjö ; Jan Rolf Erling Thimansson, Malmö, both of (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 08/894,274

(22) PCT Filed: Feb. 14, 1996

(86) PCT No.: PCT/SE96/00193

§ 371 Date: Aug. 28, 1997

§ 102(e) Date: Aug. 28, 1997

(87) PCT Pub. No.: WO96/26619

PCT Pub. Date: Aug. 29, 1996

(30) Foreign Application Priority Data

Feb. 24, 1995 (SE) .................................................... 9500690

(51) Int. Cl.[7] .............................. G08C 17/00; H04J 3/06
(52) U.S. Cl. .......................... 370/311; 370/509; 455/38.3
(58) Field of Search .................................... 455/383, 343, 455/574, 572; 370/310, 311, 337, 345, 350, 465, 503, 328, 329, 330, 335, 509, 511, 512, 522, 514, 513

(56) References Cited

U.S. PATENT DOCUMENTS

| | | | |
|---|---|---|---|
| 5,175,874 | * 12/1992 | Auchter | 455/343 |
| 5,613,235 | * 3/1997 | Kivari et al. | 455/343 |
| 5,668,803 | * 9/1997 | Tymes et al. | 370/312 |
| 5,790,941 | * 8/1998 | Peponides | 455/343 |
| 5,794,137 | * 8/1998 | Harte | 455/343 |

FOREIGN PATENT DOCUMENTS

| | | | |
|---|---|---|---|
| 0 319 219 A2 | * 7/1989 | (EP) | H04Q/7/02 |
| 2 229 893 | 10/1990 | (GB) . | |
| 2 276 516 | 9/1994 | (GB) . | |
| WO91/19357 | 12/1991 | (WO) . | |
| WO92/19049 | 10/1992 | (WO) . | |

\* cited by examiner

*Primary Examiner*—Chau Nguyen
*Assistant Examiner*—Soon-Dong Hyun
(74) *Attorney, Agent, or Firm*—Burns, Doane, Swecker & Mathis, L.L.P.

(57) ABSTRACT

In a method and an apparatus for reducing the power consumption of a battery operated transceiver in standby mode, particularly a mobile telephone station, in which the receiver of the transceiver is adapted to receive successive word blocks on a forward control channel, each word block consisting of a predetermined number of bits forming a dotting sequence, a word synchronization sequence and a predetermined number of word repeats, a switching device is adapted to switch off the receiver after a word repeat in a word block has been validly received, and to switch on the receiver to receive a word repeat in the next successive word block.

8 Claims, 3 Drawing Sheets

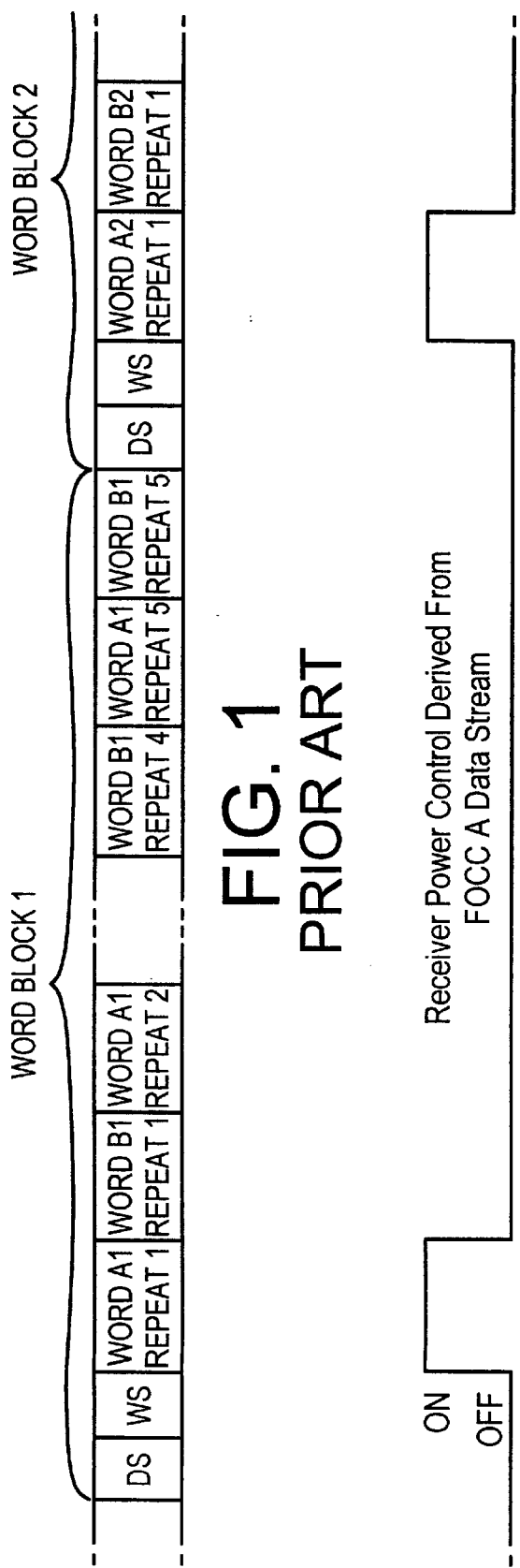
FIG. 1
PRIOR ART
FIG. 4a
PRIOR ART
FIG. 4b
PRIOR ART

METHOD AND APPARATUS FOR REDUCING THE POWER CONSUMPTION OF A BATTERY OPERATED TRANSCEIVER

TECHNICAL FIELD

This invention relates to a method and an apparatus for reducing the power consumption of a battery operated transceiver in standby mode, particularly a mobile telephone station, wherein successive word blocks are received by the receiver of the transceiver on a forward control channel, each word block consisting of a predetermined number of bits forming a dotting sequence, a word synchronization sequence and a predetermined number of word repeats.

BACKGROUND

A mobile telephone station in standby mode must monitor the appropriate control channel of the system in which it is located in a manner such that the mobile telephone station receives all system control messages addressed to it. This necessarily requires that the mobile telephone station monitors the control channel during any time periods within which control messages directed to that mobile telephone station could possibly be transmitted.

In systems such as the EIA/TIA-553 system (AMPS), the Total Acccess Communications System (TACS), and the D-AMPS IS-136 system, a mobile telephone station in standby mode, receives successive word blocks on a forward control channel (FOCC). Each word block consists of a 10-bit dotting sequence, an 11-bit word synchronization sequence, and ten word repeats each containing 40 bits. The word repeats are separated into two time-multiplexed data streams, the A stream and the B stream, each consisting of five word repeats. Depending on the last digit of the subscriber number, a mobile telephone station in standby mode listens to either the A stream or the B stream.

In the above systems, when the mobile telephone station monitors the forward control channel, the receiver is constantly on in that all five repeats of a word within a word block, are received, whereupon a majority decision is made, and BCH (Bose-Chaudhuri-Hocquenqhem) decode operations and parity check operations are performed. Thus, battery power is consumed in a mobile telephone station also in the standby mode. Moreover, this power consumption of the receiver of the mobile telephone station, when the mobile telephone station is monitoring the forward control channel, is a significant percentage of the total power consumption of the mobile telephone station.

SUMMARY

The object of the invention is to bring about a method and an apparatus for reducing the power consumption of a mobile telephone station in standby mode.

This is attained by the method according to the invention in that the receiver is switched off after a word repeat in a word block has been validly received, and the receiver is switched on to receive a word repeat in the next successive word block.

According to the invented method, the receiver is switched on in that time pulses are generated, said time pulses corresponding to bits that should have been received, had the receiver not been switched off, that said time pulses are counted, and that the receiver is switched on when the number of time pulses counted corresponds to the number of bits between the end of a word repeat in one word block and the beginning of a word repeat in the next word block.

According to the invented method, said time pulses are generated by a clock generator in a free-running mode, said clock generator being brought into said free-running mode from a tracking mode, in which the clock generator tracks the bits received, when the receiver is switched off.

According to the invented method the receiver is switched off after a word repeat in a word block has been validly received, and the receiver is switched on again to receive the same word repeat in the next word block.

According to the invented method, the receiver is switched off after the first word repeat in a word block has been validly received, and the receiver is switched on again to receive the first word repeat in the next word block.

According to the invented method, valid reception of a word repeat is determined by performing a parity check of its parity field.

The above object is also attained by the apparatus according to the invention in that a switching means is adapted to switch off the receiver after a word repeat in a word block has been validly received, and to switch on the receiver to receive a word repeat in the next successive word block.

According to the invented apparatus, said switching means is adapted to switch on said receiver upon receipt of a control signal from a counting means, said counting means being adapted to count time pulses corresponding to bits that should have been received,-had the receiver not been switched off, and to generate the control signal when the number of time pulses counted corresponds to the number of bits between the end of a word repeat in one word block and the beginning of a word repeat in the next word block.

According to the invented apparatus, a clock generator is adapted, in a free running mode, to generate said time pulses corresponding to bits that should have been received, had the receiver not been switched off, and, in a tracking mode, to track the bits received by the receiver, said clock generator being brought into said free running mode from said tracking mode by said switching means when the receiver is switched off.

According to the invented apparatus, said switching means is adapted to switch off the receiver after a word repeat in a word block has been validly received, and to switch on the receiver to receive the same word repeat in the next word block.

According to the invented apparatus, said switching means is adapted to switch off the receiver after the first word repeat in a word block has been validly received, and to switch on the receiver to receive the first word repeat in the next word block.

According to the invented apparatus, said switching means is adapted to determine valid reception of a word repeat in a word block by performing a parity check of the parity field of the word repeat.

BRIEF DESCRIPTION OF THE DRAWINGS

The invention will be described more in detail below with reference to the appended drawings, in which FIG. 1 illustrates A and B data streams transmitted on an analog forward control channel in a D-AMPS, AMPS or TACS system.

DETAILED DESCRIPTION

FIG. 1 illustrates a complete word block 1 and part of a successive word block 2, received in standby mode by the receiver of a transceiver, particularly a mobile telephone station, in a D-AMPS, AMPS or TACS system.

Each word block consists of a 10-bit dotting sequence DS, an 11-bit word synchronization sequence WS, and five word repeats for an A mobile telephone station and five word repeats for a B mobile telephone station. Each word repeat contains 40 bits, including a parity field. Whether a mobile station is an A or a B station is determined by the last digit of the subscriber number.

As indicated in FIG. 1, in word block 1, there are five repeats of word A1 for a A mobile telephone station, and five repeats of word B1 for a B mobile telephone station.

In word block 2, only the first repeat of word A2 and the first repeat of word B2 are shown for the A mobile telephone station and the B mobile telephone station, respectively.

Figure 2:
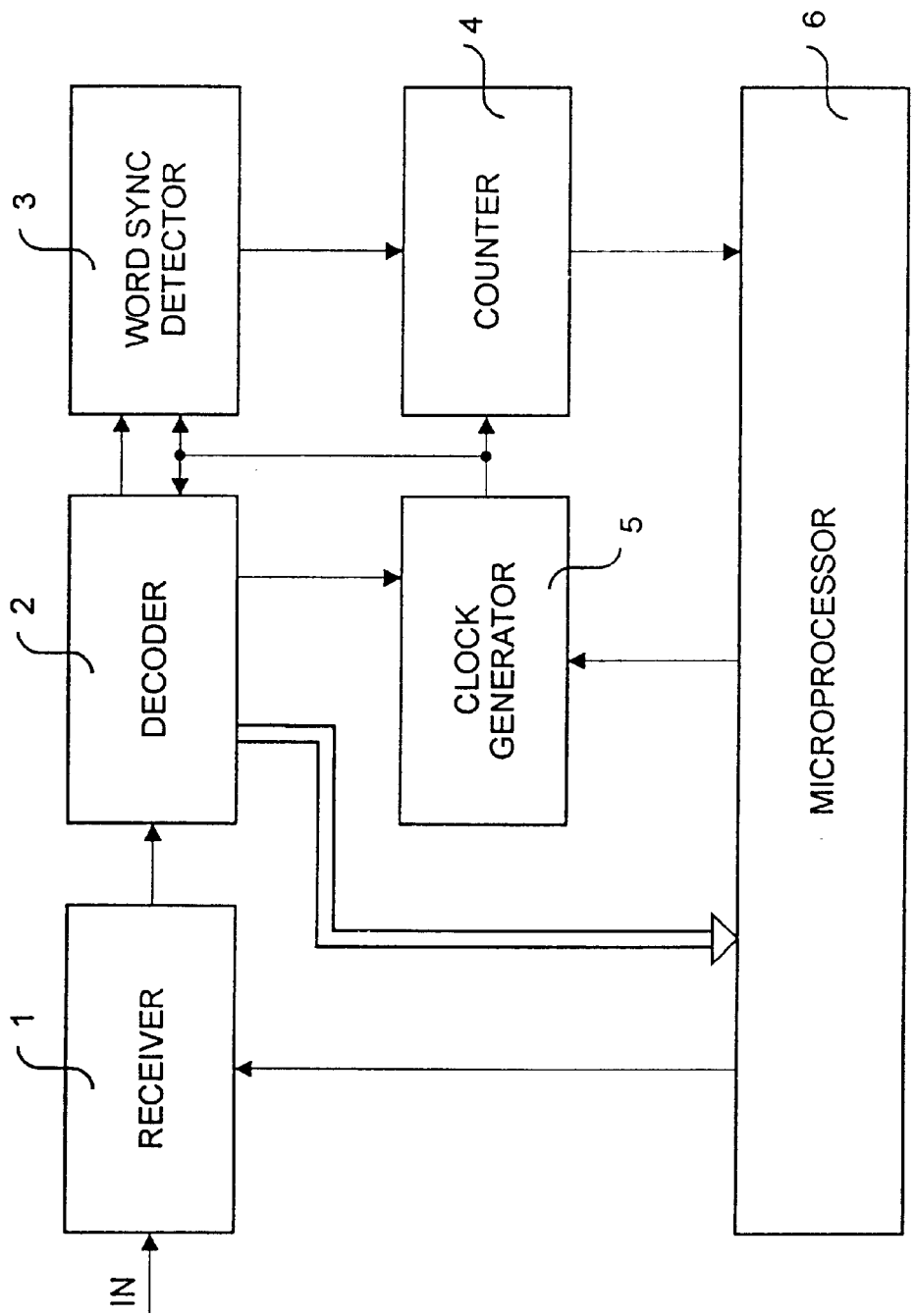
FIG. 2 is a schematic block diagram of the receiver of a mobile telephone station, which operates according to the invention.

In FIG. 2 which is a schematic block diagram of the receiving portion of a mobile telephone station, 1 denotes a receiver having an input IN, 2 denotes a decoder for decoding the data received by the receiver 1, 3 denotes a word synchronization detector, 4 denotes a counter, 5 denotes a clock generator, and 6 denotes a microprocessor.

By means of the flow diagram in FIG. 3 and the time diagrams in FIGS. 4A and 4B, the operation of the receiving portion in FIG. 2 will now be described.

At Step 300 the process begins in that the power to the receiver 1 is switched on. At Step 301 the receiver 1 is tuned to a forward control channel (FOCC), and at Step 302 the clock generator 5 in FIG. 2 is set to tracking mode. This means that the rate of the time pulses generated by the clock generator 5 will track the rate of the bits of the incoming word block as decoded by the decoder 2.

At Step 303 word synchronization is performed by means of the word synchronization detector 3. The word synchronization is carried out on the word synchronization sequence WS of a word block, e.g. word block 1 in FIG. 1.

At Step 304 repeat 1 of a word of a word block is received, e.g. word A1 of word block 1 in FIG. 1. The repeat 1 of word A1 of word block 1 is received by the microprocessor 6 from the decoder 2 as indicated by the doubled-lined arrow in FIG. 2.

At Step 305 the microprocessor 6 performs a BCH decode operation on the received repeat 1 of word A1. A BCH decode operation is well known in this connection and will, consequently, not be described further. At Step 306, the parity, derived at Step 305 from the parity field of the received repeat 1, is checked to verify a correct reception of repeat 1 of word A1 of word block 1.

If the parity as checked at Step 306, is OK, at Step 307 the number of "sleep bytes" between the last byte in repeat 1 of word A1 of word block 1 and the first byte in repeat 1 of word A2 of word block 2, is calculated.

At Step 308 the clock generator 5 is set to free running mode, and at the same time the receiver 1 is switched off at Step 309 by the microprocessor 6.

Since the receiver 1 is now off, the time pulses gene-rated by the clock generator 5 in free running mode correspond to the bits that should have been received, had the receiver 1 not been switched off. These time pulses are counted by the counter 4 which informs the microprocessor 6 of every counted "sleep byte" at Step 310.

At Step 311 the microprocessor 6 checks whether a "sleep byte" issued by counter 4 is the last "sleep byte" as calculated at Step 307.

Figure 3:
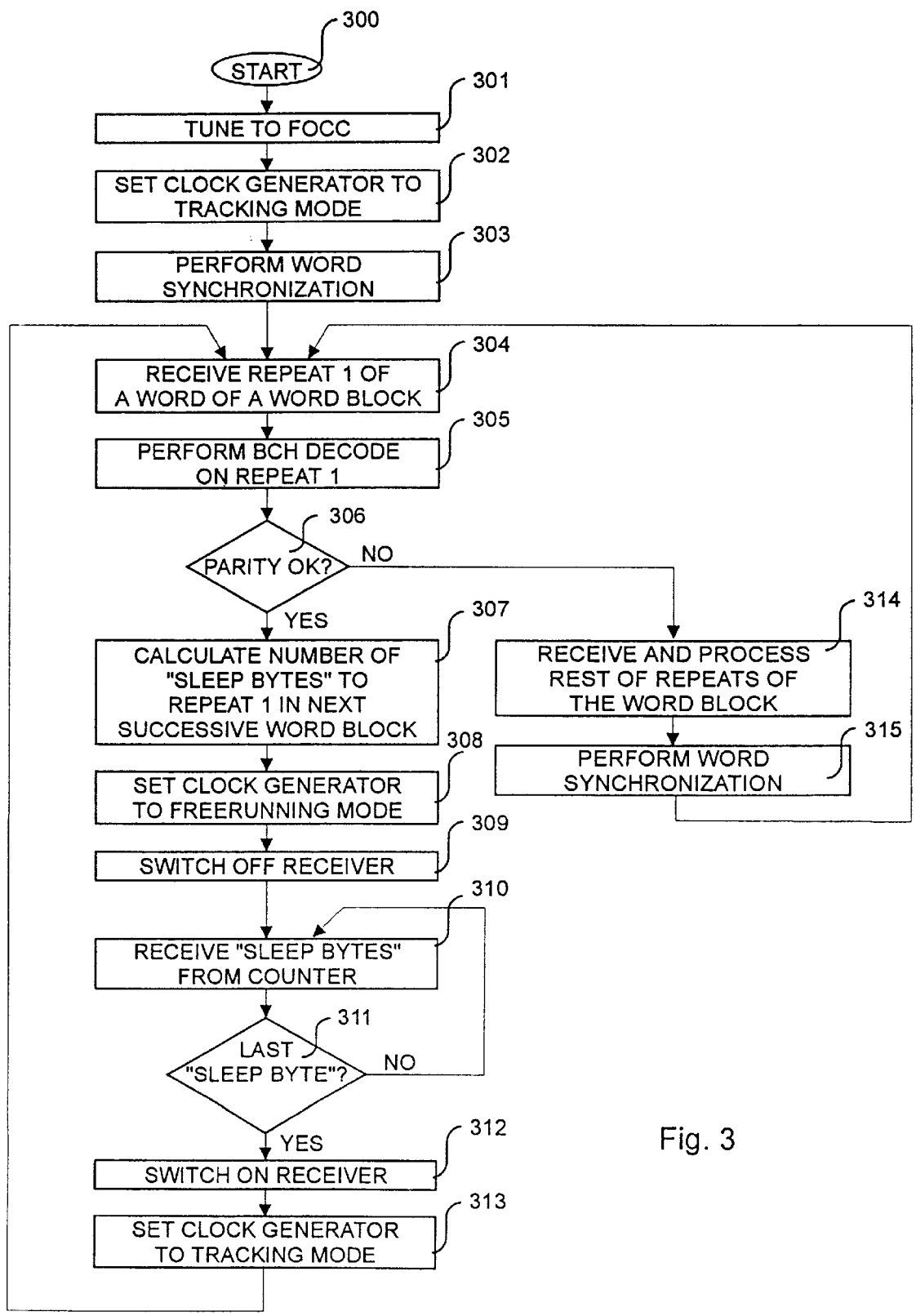
FIG. 3 is a flow diagram which illustrates steps performed according to the invention in the receiver according to FIG. 2, and FIGS. 4a and 4b are time diagrams illustrating the on and off periods of a receiver in a mobile telephone station listening to the A data stream and the B data stream, respectively.

If "YES", the microprocessor 6 turns on the receiver 1 at Step 312 and at the same time at Step 313 the clock generator 5 is set to tracking mode again to receive repeat 1 of word A2 of word block 2, whereupon the process goes back to Step 304 in FIG. 3.

If the parity of repeat 1 of word A2 of word block 2 is OK as checked at Step 306, the receiver 1 will again be switched off at Step 309.

Thus, as apparent from FIG. 4a, the receiver 1 in an A mobile telephone station will be on only during repeat 1 of a word A in each word block. The same is true for a B mobile telephone station which will be on only during repeat 1 of a word B in each word block. Consequently, the power reduction effect is equal for both A and B mobile telephone stations.

If, at Step 306, the parity of repeat 1 of a word in a word block, is not OK, the rest of the repeats of that word in the word block, is received at Step 314, whereupon at Step 315 a word synchronization has to be performed again by means of the word synchronization detector 3.

At Step 314, when the rest of the repeats of the same word have been received, a majority decision is made and BCH decode operations and parity check operations are performed in a conventional manner.

After that the word synchronization has been performed at Step 315, repeat 1 of a word of the successive word block is received at Step 304 and the process goes on as described above.

In accordance with the invention, the sleep time is prolonged over the end of a current word block and the bit and word synchronization sequences of the following word block, i.e. the receiver 1 is switched on exactly in time for receiving the first word repeat in the successive word block. Thus, the sleep time equals the maximal theoretical one between equal-numbered word repeats in two successive word blocks.

By means of the invention, the resynchronization to the received data stream, after tuning to a forward control channel and initial use of the word synchronization sequence, is avoided. This minimizes the risk of false word synchronization detection after the sleep periods, which could occur if the sleep time was different from the one described above.

At Step 304 in FIG. 3, it is not absolutely necessary to receive the first repeat of-a word of a word block and carry out the rest of the process in relation to that first repeat. In fact, it is theoretically possible to select any of the five repeats at Step 304 to be received and run through the process on the basis on that selected repeat. However, if at Step 306 it is found that the parity of the selected received repeat is not OK, too little data may be received at Step 314 to make a majority decision. Thus, in practice, the first repeat of a word of a word block should be received.

Also, at Step 306, if the parity of the first word repeat is found to be not OK, at Step 314 just the second repeat could be received instead of all the repeats 2–5. In that case the BCH decode operation at Step 305 would have to be performed on that second repeat. If the parity as checked at Step 306 is found to be OK for that second repeat, the process would continue at Step 307 by calculating the number of "sleep bytes" from that second repeat to the first repeat in the next successive word block.

What is claimed is:

1. A method for reducing the power consumption of a battery operated transceiver in standby mode, particularly a mobile telephone station, wherein successive word blocks are received by a receiver of the transceiver on a forward control channel, each word block consisting of a predetermined number of bits forming a dotting sequence, a word synchronization sequence and a predetermined number of word repeats, comprising the steps of switching off the receiver after a respective word repeat in a current word block has been validly received, and switching on the receiver to receive a corresponding word repeat in a next successive word block, wherein the receiver is switched on when a number of time pulses counted corresponds to a number of bits between an end of the respective word repeat in the current word block and a beginning of the corresponding word repeat in the next word block, wherein the time pulses correspond to bits that should have been received, had the receiver not been switched off, and the time pulses are generated by a clock generator in a free-running mode, said clock generator being brought into said free-running mode from a tracking mode, in which the clock generator tracks the bits received, when the receiver is switched off.

2. A method as claimed in claim 1, wherein the receiver is switched off after the respective word repeat in the current word block has been validly received, and the receiver is switched on again to receive a same word repeat in the next word block.

3. A method as claimed in claim 2, wherein the receiver is switched off after a first word repeat in the current word block has been validly received, and the receiver is switched on again to receive a first word repeat in the next word block.

4. A method as claimed in claim 1, wherein valid reception of each word repeat is determined by performing a parity check of its parity field.

5. An apparatus for reducing the power consumption of a battery operated transceiver in standby mode, particularly a mobile telephone station, wherein a receiver of the transceiver receives successive word blocks on a forward control channel, each word block consisting of a predetermined number of bits forming a dotting sequence, a word synchronization sequence and a predetermined number of word repeats, comprising a switching device that switches off the receiver after a respective word repeat in a current word block has been validly received, and switches on the receiver to receive a corresponding word repeat in the next successive word block, and a clock generator that in a free running mode, generates time pulses corresponding to bits that should have been received, had the receiver not been switched off, and, in a tracking mode, tracks the bits received by the receiver, said clock generator being brought into said free running mode from said tracking mode by said switching device when the receiver is switched off, wherein the switching device switches on said receiver upon receipt of a control signal from a counting means, said counting means counting the time pulses corresponding to bits that should have been received, had the receiver not been switched off, and generating the control signal when the number of time pulses counted corresponds to the number of bits between the end of the respective word repeat in the current word block and a beginning of the corresponding word repeat in the next word block.

6. An apparatus as claimed in claim 5, wherein the switching device switches off the receiver after the respective word repeat in the current word block has been validly received, and switches on the receiver to receive a same word repeat in the next word block.

7. An apparatus as claimed in claim 6, wherein the switching device switches off the receiver after a first word repeat in the current word block has been validly received, and switches on the receiver to receive a first word repeat in the next word block.

8. An apparatus as claimed in claim 5, wherein the switching device determines valid reception of each word repeat in each word block by performing a parity check of the parity field of the word repeat.

* * * * *